US006990414B2

(12) United States Patent
Belke et al.

(10) Patent No.: US 6,990,414 B2
(45) Date of Patent: Jan. 24, 2006

(54) ELECTRONIC GAS FLOW MEASUREMENT AND RECORDING DEVICE

(76) Inventors: Brad Belke, P.O. Box 1100, Nisku, Alberta (CA) T9E 8A8; Thomas MacArthur, 4188 - 93 Street, Edmonton, Alberta (CA) T6E 5P5; Jack Hurford, 4188 - 93 Street, Edmonton, Alberta (CA) T6E 5P5

( * ) Notice: Subject to any disclaimer, the term of this patent is extended or adjusted under 35 U.S.C. 154(b) by 18 days.

(21) Appl. No.: 10/790,194

(22) Filed: Mar. 2, 2004

(65) Prior Publication Data

US 2004/0173091 A1    Sep. 9, 2004

Related U.S. Application Data

(60) Provisional application No. 60/450,662, filed on Mar. 3, 2003.

(51) Int. Cl.
  *B01D 46/46* (2006.01)
(52) U.S. Cl. ...................................................... 702/45
(58) Field of Classification Search ...................... None
  See application file for complete search history.

(56) References Cited

U.S. PATENT DOCUMENTS

| 4,006,634 | A |   | 2/1977  | Billette et al.        |
|-----------|---|---|---------|------------------------|
| 4,149,254 | A |   | 4/1979  | Molusis                |
| 4,173,891 | A | * | 11/1979 | Johnson ......... 73/861.79 |
| 4,798,092 | A |   | 1/1989  | Lagergren et al.       |
| 4,799,169 | A |   | 1/1989  | Mims                   |
| 4,821,580 | A |   | 4/1989  | Jorritsma              |
| 4,843,890 | A |   | 7/1989  | Samson et al.          |
| 4,879,911 | A |   | 11/1989 | Zolock                 |
| 4,885,943 | A |   | 12/1989 | Tootell et al.         |
| 4,934,196 | A |   | 6/1990  | Romano                 |
| 5,062,446 | A |   | 11/1991 | Anderson               |
| 5,251,149 | A |   | 10/1993 | Williams et al.        |
| 5,365,795 | A |   | 11/1994 | Brower, Jr.            |
| 5,551,305 | A |   | 9/1996  | Farchi et al.          |
| 5,574,229 | A |   | 11/1996 | Castillo               |
| 5,656,784 | A |   | 8/1997  | Butch                  |
| 5,753,827 | A |   | 5/1998  | Cage                   |
| 5,804,741 | A |   | 9/1998  | Freeman                |
| 5,831,176 | A | * | 11/1998 | Morgenthale et al. ... 73/861.77 |
| 5,866,824 | A | * | 2/1999  | Schieber ............. 73/861.79 |

(Continued)

FOREIGN PATENT DOCUMENTS

EP    0 393 859 A1    10/1990

(Continued)

*Primary Examiner*—Michael Nghiem
*Assistant Examiner*—Cindy D. Khuu
(74) *Attorney, Agent, or Firm*—Donald V. Tomkins

(57) ABSTRACT

An electronic flow measurement device (EFM), for use in conjunction with a flow meter in a pressurized gas line, has a microprocessor and read-only memory (ROM), and calculates and records gas flow rates corrected for variable factors such as gas pressure, temperature, and density. Look-up tables stored in the ROM contain intermediate values calculated in accordance with selected protocols for selected ranges of input variables such as gas temperature, pressure, density, and turbine "K" factors. Based on inputs received from gas temperature and pressure sensors, the EFM selects corresponding intermediate values from the look-up tables, and then uses these values to calculate corrected gas flow rates, using software residing in the EFM. The microprocessor's power consumption is significantly reduced because the use of look-up tables reduces the complexity and extent of calculations that the EFM needs to perform, as compared with performing all required calculations in the EFM.

22 Claims, 14 Drawing Sheets

| U.S. PATENT DOCUMENTS | | | |
|---|---|---|---|
| RE36,597 E | 3/2000 | Agar et al. | |
| 6,256,590 B1 | 7/2001 | Keech | |
| 2002/0069022 A1 | 6/2002 | Fincke | |
| 2002/0198668 A1 | 12/2002 | Lull et al. | |

| FOREIGN PATENT DOCUMENTS | | | |
|---|---|---|---|
| EP | 1 184 616 A2 | 3/2002 | |
| WO | WO 97/04288 A1 | 2/1997 | |

* cited by examiner

FIG. 4C

ELECTRONIC GAS FLOW MEASUREMENT AND RECORDING DEVICE

This application claims the benefit, pursuant to 35 U.S.C. 119(e), of U.S. Provisional Application No. 60/450,662; filed on Mar. 3, 2003, and said provisional application is incorporated herein by reference.

FIELD OF THE INVENTION

The present invention relates to devices for measuring and recording the volumetric flow of pressurized gas in pipelines, particularly natural gas.

BACKGROUND OF THE INVENTION

Accurate measurement of gas flow in pipelines is important in a variety of situations, such as in the transmission of fuel gases such as natural gas and propane. Fuel gases are typically sold by volumetric measure, so gas flow must be accurately measured and recorded to ensure that customers are charged fully and fairly for the gas delivered to them. Accurate flow measurement is also important for optimum operational control in gas production and processing facilities.

Gas flow measurement and recording are commonly carried out by use of an orifice meter installed in a gas pipeline in conjunction with a circular chart recorder, such as the Models J8, M202, and M208 chart recorders manufactured by Barton Instrument Systems, LLC, of Industry, Calif. An orifice meter works on the venturi principle, in accordance with well-known scientific formulae (specifically, Bernoulli's equation). Its primary feature is an orifice plate, which is a flat plate having a sharp-edged circular or oval orifice that is smaller in diameter than the inner diameter of the pipeline. The orifice plate is installed such that its plane is transverse to the axis of the pipeline, and typically (though not necessarily) with the orifice coaxial with the pipeline. The orifice plate causes a localized constriction of the gas flow, thus causing the gas flow velocity to increase as the gas passes through the orifice, with a resultant drop in pressure on the downstream side of the orifice plate. The gas pressure on each side of the orifice plate is continuously measured by means of upstream and downstream pressure taps closely adjacent to the orifice plate. Because gas temperature is an important factor for accurate calculation of gas flow, the gas temperature is continuously measured upstream of the orifice meter using a temperature sensor such as a resistive temperature device ("RTD").

The temperature and differential pressure readings are communicated to the chart recorder, which features multiple inkpens that continuously plot the information onto rotating circular paper charts. These charts, which typically record readings over a 7-day period, must be regularly replaced with fresh charts, and the recorded charts must be analyzed and interpreted by skilled technicians to determine the gas flows represented by the information thereon. The calculation of gas flow rates must also take into consideration the particular chemical composition of the gas in question, or, more specifically, the density of the gas.

Natural gas flow calculations are typically required to be made in accordance with analytical methods stipulated by the American Gas Association ("AGA"). Where orifice meters are used, the applicable standards are AGA-3 (for orifice flow calculations), and. AGA-8 or NX-19 (to adjust for supercompressibility).

The use of orifice meters and circular chart recorders has a number of practical drawbacks. The accuracy of the gas flow readings is dependent on selection of orifice plates having orifices of appropriate sizes, and this is something that varies with the gas flow rate. Accordingly, it is periodically necessary to change orifice plates to suit variations in gas flow rates. This requirement entails additional labour costs, as does the need for regular gathering and replacement of the circular charts. To these inconveniences must be added the need for periodic adjustment, maintenance, and repair of the inkpens, plus the need to interpret the charts before reliably accurate gas flow measurements can be obtained.

Some of these drawbacks can be overcome by using an electronic flow-measurement device (or "EFM") in place of a circular chart recorder. Examples of known EFMs include the Daniel® FloBoss™ 103 and FloBoss™ 503 flow computers manufactured by Daniel Measurement and Control Inc., of Houston, Tex. Such EFMs have microprocessors or CPUs (central processing units) that directly calculate gas flows in accordance with AGA-3 and AGA-8 (or NX-19), which are incorporated into the EFM's memory (i.e., as "firmware"). These EFMs provide for digital read-out of instantaneous and historical gas flow rates, and can archive flow calculations covering a period of several weeks, such that this information can be collected at larger and more convenient intervals than would be possible using a chart recorder. Alternatively, and even more advantageously, the flow rate calculations can be transmitted to a remote collection point location, by either hard-wired or wireless data communication links, eliminating or greatly reducing the need for regular visits by field technicians.

It can therefore be seen that EFMs can be used to avoid the drawbacks of circular chart recorders and the interpretation process necessarily associated therewith. However, the disadvantages associated with orifice meters, and in particular the recurring need to replace orifice plates, still remain. These disadvantages may be overcome by using a turbine flow meter instead of an orifice meter.

A turbine meter features a free-wheeling turbine rotor having multiple turbine blades. To measure gas flow, the turbine meter is installed in a gas pipeline with the rotor coaxial with the pipe. The flow of gas in the pipeline causes the turbine rotor to rotate. It is well established that for a given turbine, there is a substantially direct relationship between the number of turbine rotations and the volume of gas flowing past the turbine; It follows that if this relationship has been quantified, the gas flow rate can be easily determined by counting the number of turbine rotations over a selected time interval, and then calculating the flow using fundamental mathematics.

The same result can obviously be achieved by counting partial revolutions corresponding to the angular spacing of the turbine blades, and this is in fact what is almost invariably done. In some common types of turbine meter, the turbine blades are made of a magnetic material (such as mild steel), while the turbine housing is made of a non-magnetic material (such as stainless steel). A sensing element incorporating a permanent magnet is positioned close to but outside the arc of the turbine blades. As each blade passes by the sensor, it interrupts the magnetic field generated by the permanent magnet. The sensor detects these magnetic field interruptions and converts them to electrical pulses, which may be totalized over a selected time interval for purposes of gas flow calculation. In other types of turbine meter, an optical sensor is used to count turbine blade pulses.

The relationship between turbine rotations and gas volume usually varies to some degree with the velocity of the gas (and therefore the flow rate). This phenomenon is taken into account by calibrating each turbine to determine its characteristics over a selected range of pulse frequencies. In accordance with industry standards, this is typically done by passing known volumes of gas through the turbine at various flow rates, to produce a 10-point linearization curve plotting the turbine's "K" factor (the number of pulses per cubic foot of gas) against the pulse frequency (pulses per second). With this information at hand, gas flows can be easily calculated by determining the pulse frequency, determining the "K" factor applicable to that frequency, and then dividing the frequency by the "K" factor, resulting in a value for the gas flow (in cubic feet per second, or other desired units of measurement).

However, accurate gas flow measurement with a turbine meter requires more information than the "K" factor of the turbine; for optimal accuracy, the gas pressure, temperature, and density should also be taken into account. Turbine meters are typically installed in conjunction with EFMs having, in addition to a pulse counter, a pressure transducer, which generates an electronic signal corresponding to the gas pressure upstream of the turbine, and an RTD connection, for reading the gas temperature downstream of the turbine. The gas density is determined by laboratory analysis, and this information is fed into the EFM's data memory. The EFM's CPU can then calculate gas flow rates corrected for these various inputs, in accordance with the appropriate industry standards programmed into the EFM as firmware; i.e., AGA-7 (for turbine meters) and AGA-8 (or NX-19). Examples of known EFM's with these capabilities are the Model BA415R gas computer manufactured by Barton Instrument Systems, and the Daniel® FloBoss™ 504 manufactured by Daniel Measurement and Control Inc.

From the preceding discussion, it can be readily seen that the drawbacks of circular chart recorders can be eliminated by use of EFMs in conjunction with orifice meters, and also that the drawbacks of orifice meters can be eliminated by use of turbine meters in conjunction with suitable EFMs. However, the known EFMs appropriate for use in both of these applications suffer from a significant disadvantage in that they have comparatively large electrical power requirements. The calculations required to be performed in accordance with the various AGA standards are complex, therefore entailing a CPU with substantial computational capacity. As well, the CPU requires very high computing speed in order to produce substantially "real time" flow readings quickly in response to continuous flows of input data from the magnetic pulse sensor, the pressure transducer, and the RTD. The electrical power needed to serve these computational requirements would make battery power impractical, having regard to the current state of battery technology. Therefore, EFMs are typically connected to conventional power sources (e.g., building or plant power), or are installed with dedicated solar panels. Such EFM installations are susceptible to interruption of gas flow data calculation and storage in the event of failure of a conventional power source or physical damage to solar panels due to storms or vandalism.

For the foregoing reasons, there is a need for EFMs that can perform all the functions of known EFMs as described above, in conjunction with either orifice meters or turbine meters, while consuming substantially less electrical power. In particular, there is a need for such EFMs which can operate effectively and efficiently on battery power, and can do so without sacrificing data display and storage capabilities as compared with known EFM that use permanent power sources or dedicated solar panels. The present invention is directed to these needs.

SUMMARY OF THE INVENTION

In general terms, the present invention is an electronic flow-measurement device (EFM) for use in conjunction with a gas flow meter mounted in association with a pressurized gas line, that calculates and records gas flow rates corrected for variable factors such as gas pressure (or pressure differential), temperature, chemical composition, and density, using substantially less electrical power than prior art flow computers performing similar calculation and data recording tasks. The electrical power requirements of the present invention are sufficiently low that it can continuously calculate gas flows and record 40 days' worth or more of calculated flows, using low-power batteries as the sole power source. For example, it has been found in field testing that two lithium "C" cell batteries can power the device for up to 14 months before requiring replacement.

The EFM of the present invention achieves these electrical power consumption reductions by greatly reducing the extent and complexity of the calculations required to be performed within the device itself. Continuous calculation of "real time" flow rates, in accordance with AGA-3, AGA-7, AGA-8, and/or NX-19 (as applicable), based on a steady flow of temperature and pressure input readings, requires a fast and powerful microprocessor, with correspondingly high electrical power requirements. However, the power requirements for storage of data in read-only memory (ROM), and for retrieval of data therefrom, are comparatively much lower. The EFM of the present invention substantially reduces the need for performing complex calculations in the computer itself, and instead uses ROM to store "look-up tables" containing data corresponding to parameters calculated in accordance with desired and selected standards (e.g., AGA standards) for selected ranges of input variables (e.g., gas temperature, pressure, chemical composition, and density). For applications using a turbine meter, data corresponding to the "K" factors for the turbine are also stored in ROM.

With all of this information stored within the device, the calculation of gas flows is greatly simplified and requires much less computing power, and therefore much less electrical power. As with prior art flow computers, the EFM of the present invention receives gas temperature inputs from a temperature sensor such as an RTD, and gas pressure inputs from a pressure transducer (and differential pressure inputs in applications with orifice meters). However, instead of using these inputs for complex calculation of gas flow rates, the EFM determines flow rates by looking up required values from the ROM look-up tables, corresponding to the measured input parameters, and then using these selected values to perform comparatively simple calculations (software for which is stored in the EFM) to determine gas flow rates, which are then stored in ROM for retrieval as desired. The flow rates thus determined have the same accuracy as if they had been calculated "from scratch" using high-powered, high-speed microprocessors in accordance with the appropriate AGA standards (as in prior art flow computers), because they have been calculated in accordance with the same methods. The difference is that a substantial part of the calculation process has effectively been performed in advance, at another location, yielding intermediate results (i.e., the look-up tables) which are entered into ROM.

The ROM data can be changed as required to suit changed conditions. For example, the chemical composition of natural gas flowing in a particular pipeline might be variable, causing a change in density. To optimize the accuracy of the flow rate data being determined by the-EFM, this revised information could be written into the device's memory using an appropriate interface, which could be any of several well-known types of interface. For example, the information could be entered using a keypad interface, or by means of a portable data storage medium such as a memory card, compact disk, or floppy disk. Alternatively, the new information could be entered from a remote location by means of a hard-wired or wireless data communication link.

The data recorded by the device may be conveniently retrieved and viewed by means of a digital read-out or a graphical user interface (GUI) associated with the device. Alternatively or in addition, the recorded data can be recorded onto a portable data storage medium such as a memory card, compact disk, or floppy disk, or the data can be transmitted to a remote location by means of a hard-wired or wireless data communication link.

Accordingly, in one aspect the present invention is an electronic gas flow measurement device for use with an orifice meter mounted in a gas pipeline, wherein the device has the following components and features:
 a housing (preferably explosion-proof);
 a microprocessor;
 a read-only memory (ROM);
 data input means, for entering data in the ROM;
 data output means, for retrieving data stored in the ROM
 means for receiving gas temperature inputs;
 means for receiving gas pressure inputs from upstream and downstream of the orifice plate; and
 a power source for operating the microprocessor;
wherein the ROM stores look-up tables of intermediate values for selected gas flow calculation parameters determined: in accordance with selected calculation methods for selected ranges of gas temperature, density, and pressure differentials, and wherein the device is programmed with software for selecting intermediate values from the look-up tables corresponding to gas temperature and temperature inputs, and for processing the selected intermediate values to calculate gas flow rates adjusted for temperature, pressure, and density.

In another aspect, the invention is an electronic gas flow measurement device for use with a turbine meter mounted in a gas pipeline, wherein the device has the following components and features:
 a housing (preferably explosion-proof);
 microprocessor;
 a read-only memory (ROM);
 data input means, for entering data in the ROM;
 data output means, for retrieving data stored in the ROM;
 means for counting turbine pulses;
 means for receiving gas temperature inputs;
 means for receiving gas pressure inputs from upstream of the turbine; and
 a power source for operating the microprocessor;
wherein the ROM stores look-up tables of intermediate- values for selected gas flow calculation parameters determined in accordance with selected calculation methods for selected ranges of gas temperature, density, and pressure, and wherein the device is programmed with software for selecting intermediate values from the look-up tables corresponding to gas temperature and temperature inputs, for determining turbine "K" factors corresponding to turbine pulse count inputs, and for processing the selected intermediate values and "K" factors to calculate gas flow rates adjusted for temperature, pressure, and density.

In a further aspect, the invention is a method of calculating gas flow rates in conjunction with an orifice meter mounted in a gas pipeline, said method including the steps of:
 calculating look-up tables comprising intermediate values for selected gas flow calculation parameters, in accordance with selected calculation methods, for selected ranges of one or more selected input variables, such as gas temperature, density, and pressure differentials (across the orifice plate of the orifice meter);
 collecting data readings for the selected input variables for a gas flowing in the pipeline;
 using the appropriate look-up tables, determining a set of intermediate values-for the selected gas flow calculation parameters corresponding to the collected data readings; and
 using the intermediate values determined from the look-up tables as input variables, calculating a gas flow rate using selected calculation methods.

In a yet further aspect, the invention is a method of calculating gas flow rates in conjunction with a turbine meter mounted in a gas pipeline, said method including the steps of:
 calculating look-up tables comprising intermediate values for selected gas flow calculation parameters, in accordance with selected calculation methods, for selected ranges of one or more selected input variables, such as gas temperature, density, and pressure;
 collecting data readings for the selected input variables for a gas flowing in the pipeline;
 using the appropriate look-up tables, determining a set of intermediate values for the selected gas flow calculation parameters, corresponding to the collected data readings;
 determining the "K" factor for the turbine over a selected range of turbine pulse frequencies, and preparing a corresponding look-up table;
 collecting a turbine pulse frequency reading, and determining a corresponding "K" factor from the corresponding look-up table; and
 using the set of intermediate values and "K" factor determined from the look-up tables as input variables, calculating a gas flow rate using selected calculation methods.

BRIEF DESCRIPTION OF THE DRAWINGS

Embodiments of the present invention will now be described with reference to the accompanying figures, in which numerical references denote like parts, and in which:

FIG. 4C illustrates an exemplary "Gas Mix Analysis" screen in accordance with the interface software.

DETAILED DESCRIPTION OF THE PREFERRED EMBODIMENT

Figure 1:
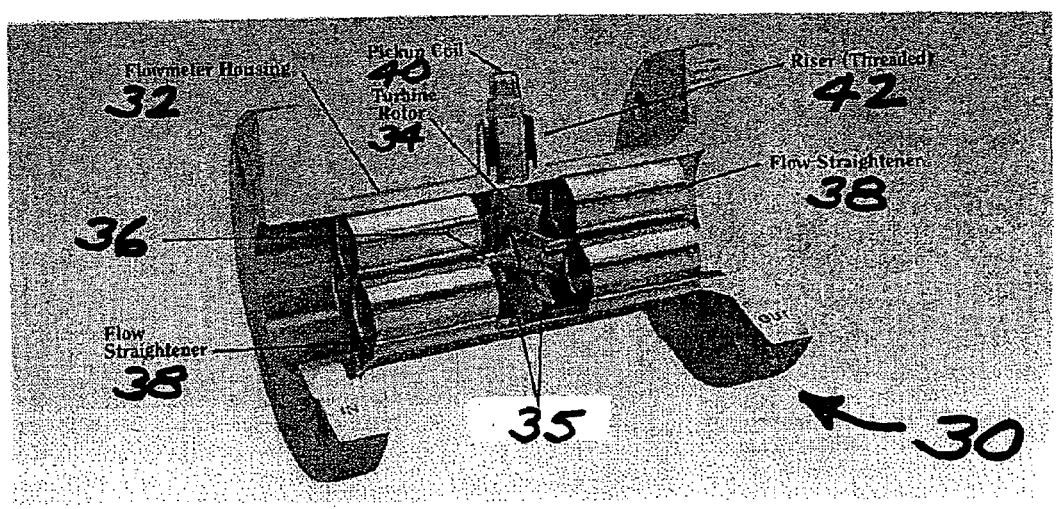
FIG. 1 is a cutaway view of a prior art turbine meter, with flow straightening tubes.

FIG. 1 illustrates a prior art turbine meter 30, mounted in a flanged pipe-spool housing 32 for connection into a pressurized gas line. The turbine meter 30 has a free-wheeling rotor 34 with multiple rotor blades 35. The rotor 34 is mounted on a shaft 36 that is substantially coaxial with the pipe spool. The turbine meter 30 may include flow straightening tubes 38 to promote non-turbulent flow through the meter 30, thus enhancing the accuracy of gas flow measurements made with the turbine meter 30. A sensing element 40 is housed in a riser 42 disposed in line with the rotor 34, for sensing and counting turbine rotations as previously described.

Figure 2:
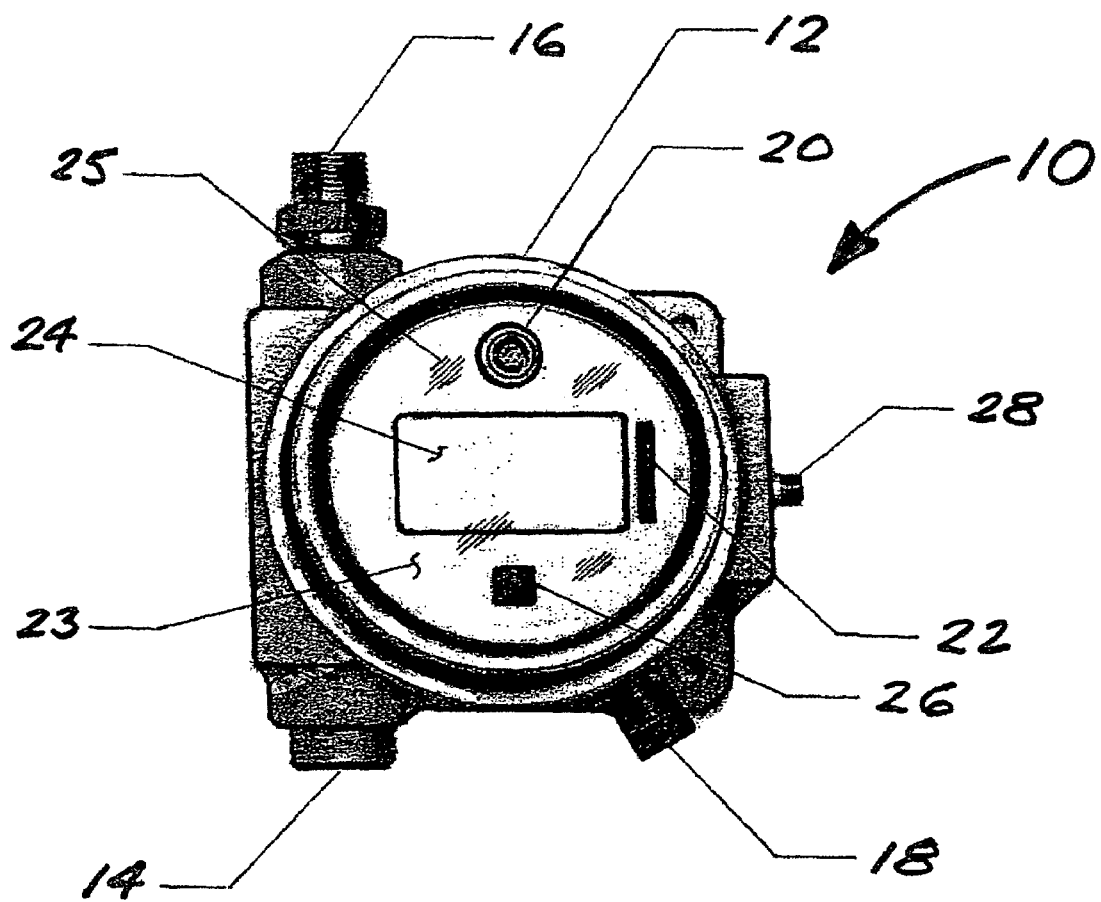
FIG. 2 is a front view of the preferred embodiment of an electronic gas flow measurement device in accordance with the invention.
Figure 2A:
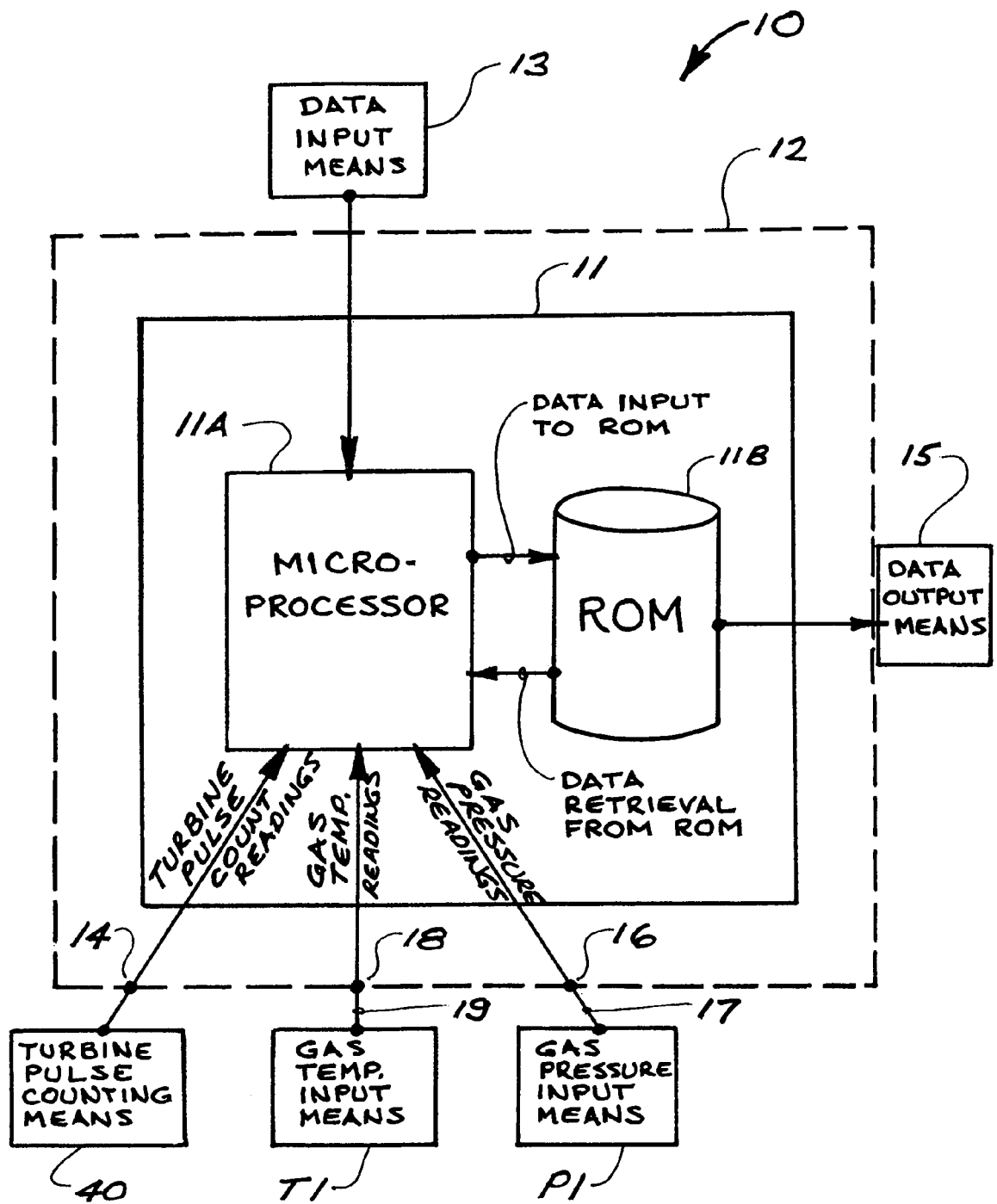
FIG. 2A is a block diagram of the computer of an electronic gas flow measurement device in accordance with an embodiment of the invention.
Figure 3:
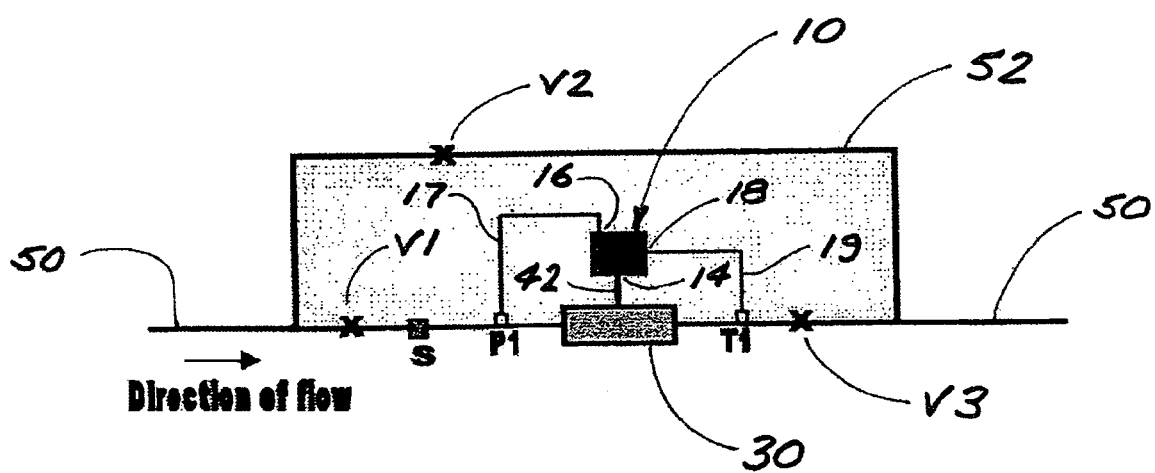
FIG. 3 is a schematic drawing illustrating a preferred method of installing the electronic gas flow measurement device in a gas line in association with a turbine flow meter.

FIG. 2 illustrates an electronic flow measurement and recording device ("EFM") 10 in accordance with the present invention, for use with a turbine flow meter. FIG. 2A is a block diagram of the EFM 10 and components thereof as will be described herein. The EFM 10 has a housing 12 which in the preferred embodiment will be an explosion-proof housing. The housing 12 has a turbine connection port 14, for connecting the device 10 to the sensing element riser 42 of a turbine flow meter 30 mounted in a gas pipeline 50, as schematically illustrated in FIG. 3. The housing 12 also has a pressure sensor port 16 for connection to a pressure sensor (or transducer) which senses gas pressure in the pipeline 50 at a point upstream of the turbine meter 30, as shown in FIG. 3. As well, the housing 12 has a temperature sensor port 18 for connection to a temperature sensor (or transducer), typically a resistive temperature device (or RTD) which senses gas temperature at a point downstream of the turbine meter 30, as shown in FIG. 3.

As illustrated in FIG. 2A, housing 12 of the EFM 10 encloses a computer 11 having a microprocessor 11A and a read-only memory (ROM) 11B, with data input means 13 for entering data in the ROM. The EFM 10 also includes computer connection means for connecting the EFM 10 with an external computer for purposes of programming the microprocessor 11A and thus "configuring" the EFM 10 in accordance with protocols described later herein. The computer connection means may be a serial port 20 as shown in FIG. 2 and FIG. 2A. The computer connection means may be used as the data input means 13, in conjunction with an external computer. However, in the preferred embodiment the data input means is a portable, readable and writable data storage means, which may be an MMC card (multi-media card), SD card (secure data card), or other portable memory means. Accordingly, in the preferred embodiment the EFM 10 has means for reading and writing data from or to a portable data storage means. In the particularly preferred embodiment illustrated in FIG. 2, the EFM 10 has an MMC card slot 22 for receiving an MMC card to be read by an MMC card reader/writer (not shown) disposed inside the housing 12. This feature can also be adapted for use as the means for programming the microprocessor.

The EFM 10 also has data output means 15 for retrieving data stored in the ROM 11B. As shown in FIG. 2, the data output means 15 will include a display screen 24 mounted in a face plate 23 that provides a digital display of current or historical gas flow data stored in the ROM 11B. The screen 24 is preferably protected by a transparent face plate cover 25 made of glass or plastic. The EFM 10 features an internal button 26 for activating the display of gas flow data. The internal button 26 is accessible only upon removal of the face plate cover 25. An external display button 28 is also provided for activating the display of gas flow data, and for additional functions as described later herein.

As previously indicated, the preferred embodiment of the EFM 10 includes an MMC card reader/writer, which permits the use of an MMC card as an additional and particularly convenient data output means 15, as will be described herein.

It will be readily appreciated by persons skilled in the art that the display screen 24 may be configured in a variety of ways, for selective display of different gas flow parameters. By way of example, the display screen 24 in FIG. 2 is adapted to display, in appropriately labeled screen sectors, parameters including gas pressure (gauge or absolute), gas flow sampling frequency, gas flow measurements and corresponding units (e.g., thousands of cubic feet or thousands of cubic meters per hour or per day), and total daily gas flows (with corresponding dates). In the preferred embodiment, the ROM 11B of the EFM 10 has capacity to store daily gas flows for at least 40 days, thus greatly reducing the frequency with which a technician needs to gather data from the unit. The EFM 10 is adapted such that a technician can use either the internal button 26 or the external button 28 to toggle through all of the daily flow records stored in the ROM 11B, thus displaying each day's total on the screen 24 for review and/or transcription by the technician as desired.

In the preferred embodiment, however, the collection of historical daily gas flows is most efficiently accomplished by removing the face plate cover 25 and inserting an MMC card into the MMC slot 22. The EFM 10 may be configured in "always on" mode, in which case all data in the ROM 11B will be automatically downloaded onto the MMC card. Alternatively, the EFM 10 may be configured so as to require depression of the external button 28 to signal the MMC card reader/writer to download the data from the ROM 11B onto the MMC card. In either case, the EFM 10 is configured so as to display a message such as "Card Busy" on the display screen 24 while downloading is in progress, and then a message such as "Card Done" to indicate that downloading is complete and that the MMC card may be extracted from the MMC card slot 22.

In alternative embodiments, the data output means 15 may include a hard-wired or wireless communications link to a computer distant from the EFM 10. In other embodiments, the data may be downloaded from the ROM 11B of the EFM 10 to an external computer connected to the EFM 10 via the serial port 20 or other computer connection means.

The downloaded data on the MMC card may be transferred to a distant location, for processing and recording as necessary desired, either by downloading the data from the MMC card (using a suitable MMC card reader) into a computer located at the distant location. Alternatively, the data may be downloaded from the MMC card to an appropriately programmed desktop or laptop computer or PDA ("personal digital assistant" such as a "Palm Pilot"™ or "Blackberry"™) and transmitting the data to the distant computer by e-mail. Cellular telephones equipped with an MMC or combined MMC/SD card slot, or combined PDA/cellular phones with such slot (for example, the Kyocera™ Model 7135), may also be used for transmission of data from the EFM 10 to a distant location, by inserting the MMC (or SD) card into the slot.

In another alternative embodiment, a "black box" data transmission unit (not shown) having a data processor and a card reader may be provided in convenient proximity to the EFM 10 (such as in a meter shed). The "black box" is in communication with a distant computer terminal by either hard-wired or wireless connection links, and is adapted or programmed such that upon insertion of an MMC card containing data downloaded from the EFM 10, the data will be automatically read by the card reader and transmitted in appropriate format to the distant terminal, with or without need for a "send" command.

Alternative embodiments of the invention may use an SD card as a data medium rather than an MMC card, with appropriate modifications as will be readily apparent to persons skilled in the art upon review of the foregoing descriptions of embodiments using an MMC card.

The EFM 10 of the present invention requires electrical power to operate its microprocessor. Where convenient, the source of electrical power may be a conventional power distribution system, in which case the EFM 10 may be plugged or hard-wired into the power system. In the preferred embodiment, however, the EFM 10 may be powered by one or more batteries. As previously mentioned, the power consumption of the EFM 10 is sufficiently low that two lithium "C" cell batteries have been found sufficient to power the EFM 10 for up to 14 months before needing replacement, while performing all of the flow calculation and data storage functions described herein. The batteries (not shown) are preferably housed within the housing 12 of the EFM 10. The EFM 10 may be adapted for connection both to batteries and to a conventional power source, with the batteries supplying power to the EFM 10 only in the event of disruption of power from the conventional power source.

FIG. 3 illustrates a typical installation of the EFM 10 of the present invention, adapted for use with and mounted in association with a turbine flow meter 30 installed in a pressurized gas pipeline 50. A by-pass line 52 is connected to the pipeline 50 on either side of the turbine meter 30. Valves V1 and V3 in the pipeline 50 and valve V2 in the by-pass line 52 are used to allow gas to pass through the turbine meter 30 or by-pass the turbine meter 30 as desired. Valves V1, V2, and V3 will typically be set so that gas passes through the turbine meter 30, as it will most commonly be desired to obtain continuously sampled flow rate data. However, the by-pass line 52 may be used when the turbine meter 30 or any of its associated components are being installed, serviced, or replaced. Preferably, a strainer S is installed in the pipeline 50 upstream of the turbine meter 30 and downstream of valve V1.

A pressure sensor line 17 connects between the pressure sensor port 16 of the EFM 10 and a pressure transducer P1 installed in pipeline 50 at a point upstream of the turbine meter 30, so that the pressure of the gas flowing in pipeline 50 can be measured and the corresponding pressure readings can be communicated to the EFM 10. Similarly, a temperature sensor line 19 connects between the temperature sensor port 18 of the EFM 10 and a temperature transducer T1 installed in pipeline 50 at a point downstream of the turbine meter 30, so that the temperature of the gas flowing in pipeline 50 can be measured and the corresponding temperature readings can be communicated to the EFM 10.

The operation of the turbine meter embodiment of the EFM 10 of the invention will now be described with reference to how the EFM 10 may be programmed to perform the functions previously described.

Figure 4:
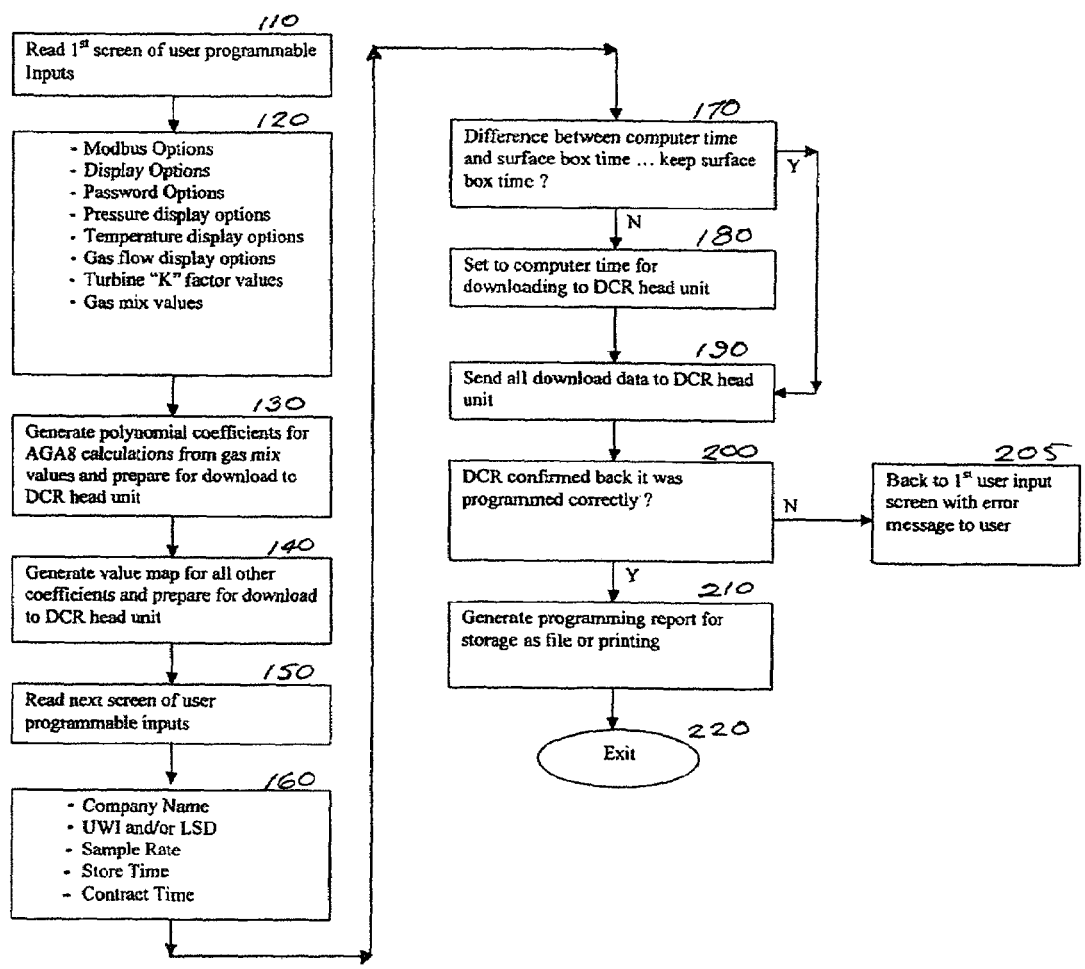
FIG. 4 is a block diagram for the interface software for programming the electronic flow measurement device in accordance with one embodiment of the invention.

FIG. 4 schematically depicts the programming steps for loading software onto the computer 11 of a turbine meter embodiment of the EFM. These programming steps are carried out on a separate programming computer temporarily connected to the EFM via the computer connection means (serial port 20 in the preferred embodiment, as previously described), using appropriate USB or serial cable and serial interface box. The programming computer may be a desktop computer, or a portable computer such as a laptop. The EFM, also referred to as the DCR (for "digital chart recorder") head unit, will typically be programmed prior to field installation, to suit the characteristics (e.g., "K" factors) of the turbine meter to which it will be fitted, and to suit the known or anticipated characteristics of the gas flowing in the pipeline in which the meter will be mounted. However, the EFM may also be reprogrammed in the field to suit changed operating parameters (for example, gas composition, or new "K" factors when a turbine meter is being replaced), and the use of a portable computer for the programming computer is particularly advantageous in such situations.

Figure 4A:
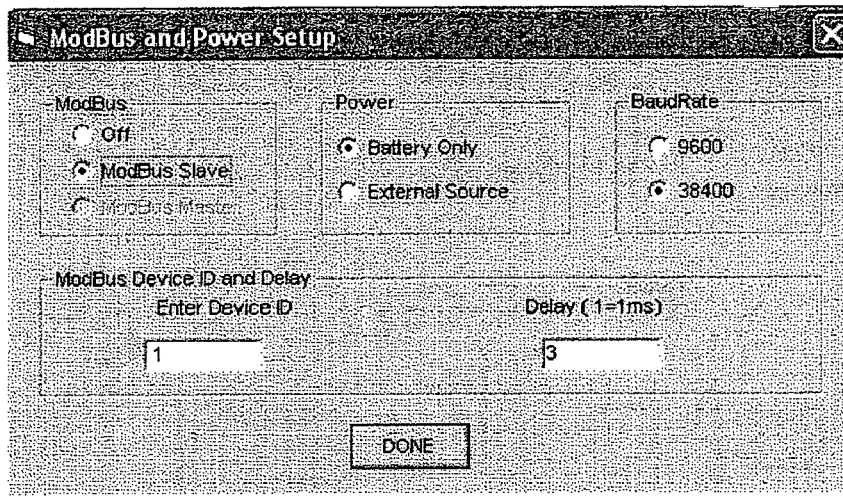
FIG. 4A illustrates an exemplary "ModBus and Power Setup" screen in accordance with the interface software.

Referring to FIG. 4, the first step in the configuration procedure is the entry of user-programmable parameters (step 120). The first screen (appearing on the monitor of the programming computer) will be a "ModBus® and Power Setup", screen generally as shown in FIG. 4A. This screen will initially indicate "Off", and "ModBus Slave" will be selected (the EFM being the "slave" and the programming computer being the "master"). The user then designates whether the EFM is to operate solely on battery power, or on power from an external source, with the EFM's battery as a back-up power source to be activated upon failure of the external source. The ModBus Options screen also allows the user to select, a serial communication speed in bauds (bits per second). The user then designates a unique address to identify the EFM for purposes of communication with the programming computer. This unique identifier also serves to identify the specific well in association with which the EFM is installed.

Figure 4B:
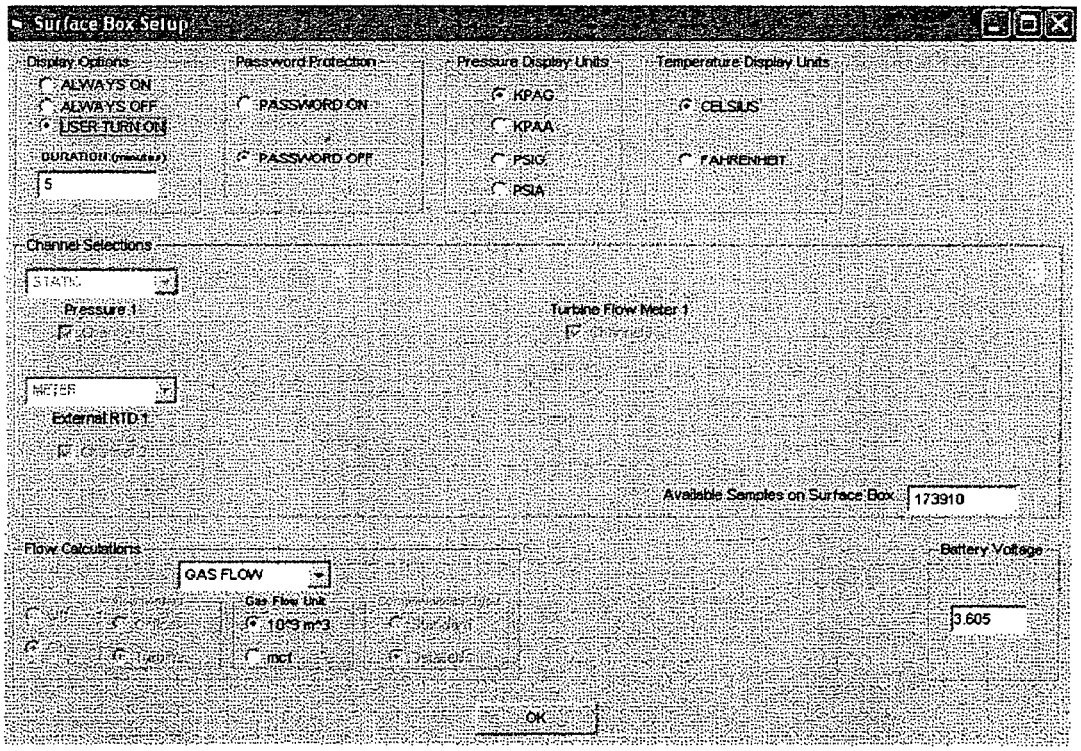
FIG. 4B illustrates an exemplary "Surface Box Setup" screen in accordance with the interface software.

The next screen will be a "Surface Box Setup" screen generally as shown in FIG. 4B ("surface box" being an alternative reference for the EFM's computer 11). The Surface Box Setup screen allows the user to configure the EFM in "Always On" mode, in which case it will continuously display flow data, or in "Always Off" or "User Turn On" mode, in either of which cases the EFM will need to be manually turned on in order to display flow data. These latter two modes are preferable to the "Always On" mode in order to minimize power consumption. The user may also select how long data remains displayed after the EFM is turned on. Other variables and options that may be entered or selected on the Surface Box Setup screen include password protection (on or off), pressure display units (kiloPascals or pounds per square inch; gauge or absolute), temperature display units (Celsius or Fahrenheit), and gas flow measurement units (thousands of cubic meters, or thousands of cubic feet, per unit time). In preferred embodiments, the user will also be able to select whether the EFM is to be configured for use with a turbine meter or an orifice meter.

Figure 4C:
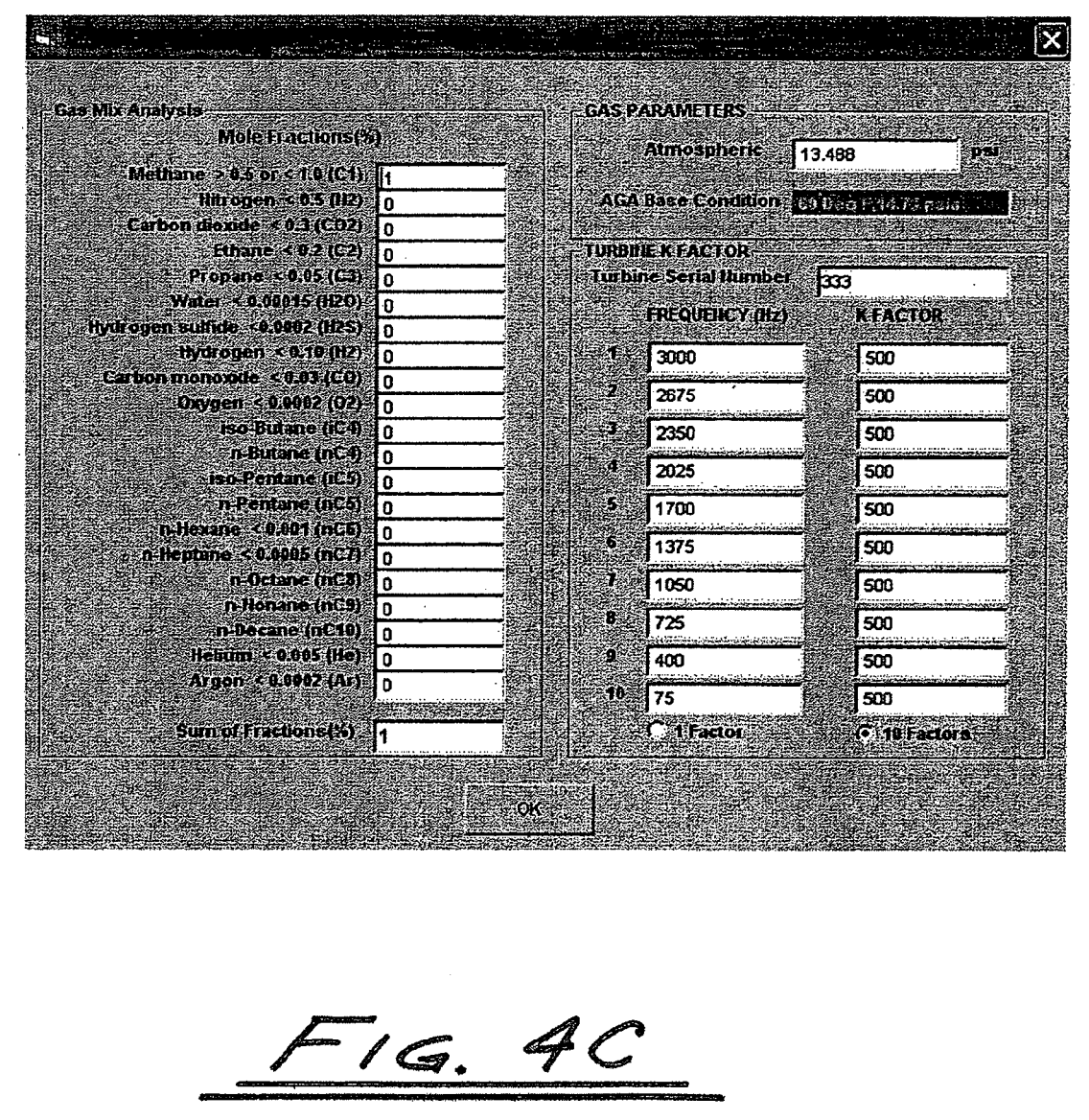

The next screen will be a "Gas Mix Analysis" screen generally as shown in FIG. 4C. On this screen, the user enters details of the chemical composition of the gas to be measured using the EFM (such details typically having been determined by laboratory analysis). Also on this screen, the user may enter "K" factors for a turbine meter to which the EFM will be mounted. The serial number of the turbine meter may also be entered on this screen. The "K" factors (in pulses per "actual" cubic foot of gas) will typically be obtained from a 10-point linearization curve determined in calibration tests as previously described. Although FIG. 4C for simplicity shows a uniform "K" factor for ten different turbine frequencies (measured in hertz; i.e., rotor revolutions per second), it will be appreciated that the "K" factors will typically vary from one frequency to another.

Upon entry of the foregoing information, the programming computer, suitably programmed, generates polynomial coefficients for AGA-8 calculations from the gas mix values (step 130). It then generates a value map (i.e., "look-up table") for all other required coefficients (step 140).

Figure 4D:
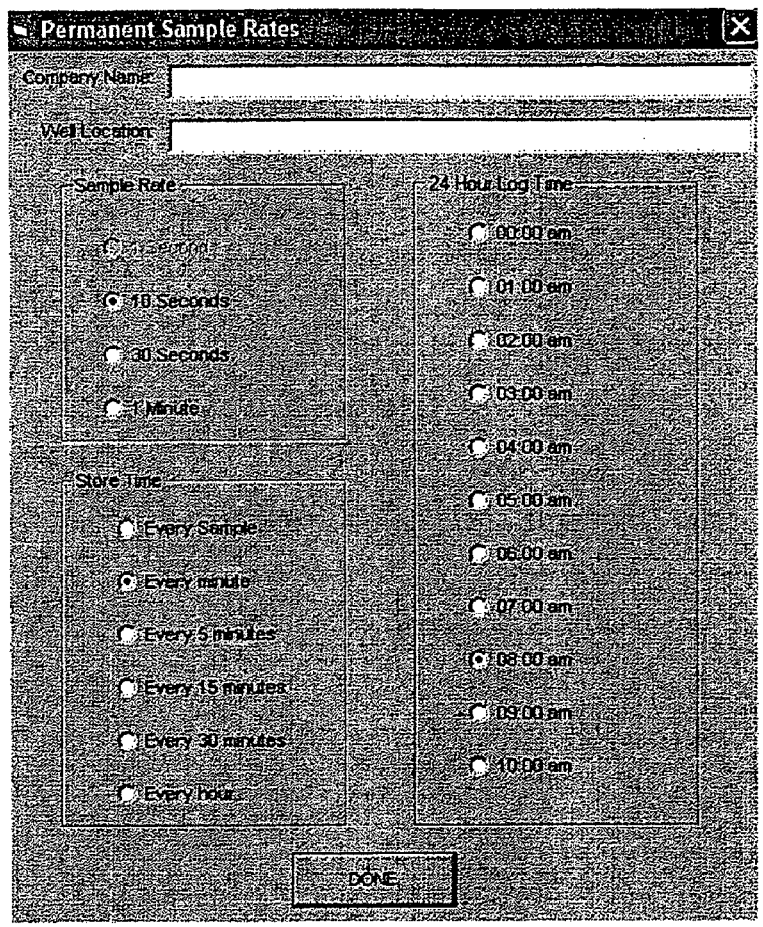
FIG. 4D illustrates an exemplary "Permanent Sample Rates" screen in accordance with the interface software.

Next, a "Permanent Sample Rates" screen will appear, generally as shown in FIG. 4D, allowing the user to enter additional information (step 160) including company name (i.e., owner of gas well), well location, preferred gas sampling frequency (commonly every 10 seconds), gas flow measurement data storage frequency or "store time" (commonly every minute), and "contract time" (i.e., preferred starting hour for compiling "daily" gas flow records).

Figure 4E:
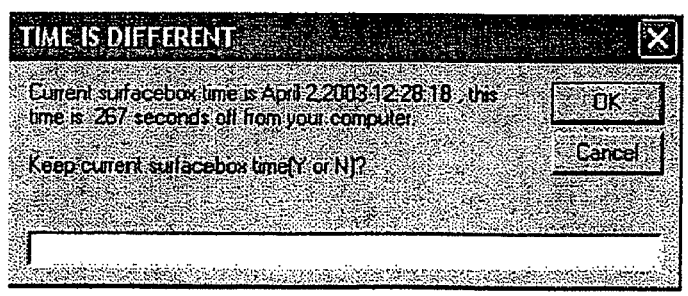
FIG. 4E illustrates an exemplary time synchronization screen in accordance with the interface software.

The next screen to appear on the programming computer display will be a time synchronization screen generally as shown in FIG. 4E. This simply indicates whether the time indicated by the internal clock of the EFM's microprocessor matches the time indicated by the programming computer, and, if these times are different, allows the user to select one time or the other (steps 170, 180).

All of the data entered or generated to this point is now downloaded to the EFM (step 190), whereupon the EFM sends a message back to the programming computer confirming whether it has been programmed properly (step 200). If the EFM has not been properly programmed, the programming computer will revert to the first user input screen (step 205), and the user input process is repeated as necessary. If the EFM has been properly programmed, the programming computer will generate a programming report, which may be stored electronically or printed as desired, to provide a record of the EFM's configuration (step 210). The programming computer then exits the interface software. (step 220). The programming computer may then be disconnected from the EFM, which is then ready for use in its intended field application.

Figure 5:
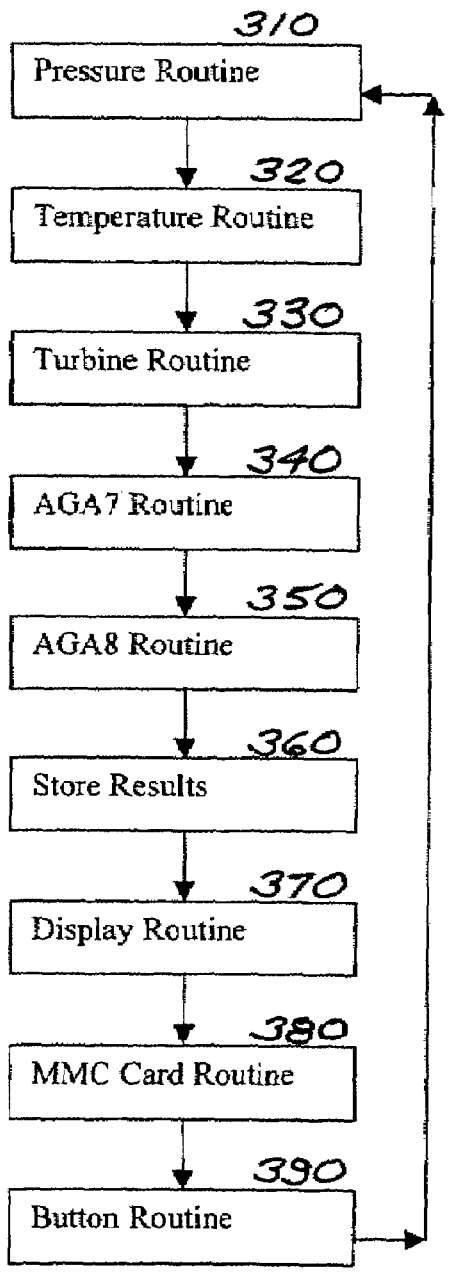
FIG. 5 is a block diagram for the main operating loop of the software resident in the electronic gas flow measurement device in accordance with one embodiment of the invention for use in association with a turbine flow meter.
Figure 5A:
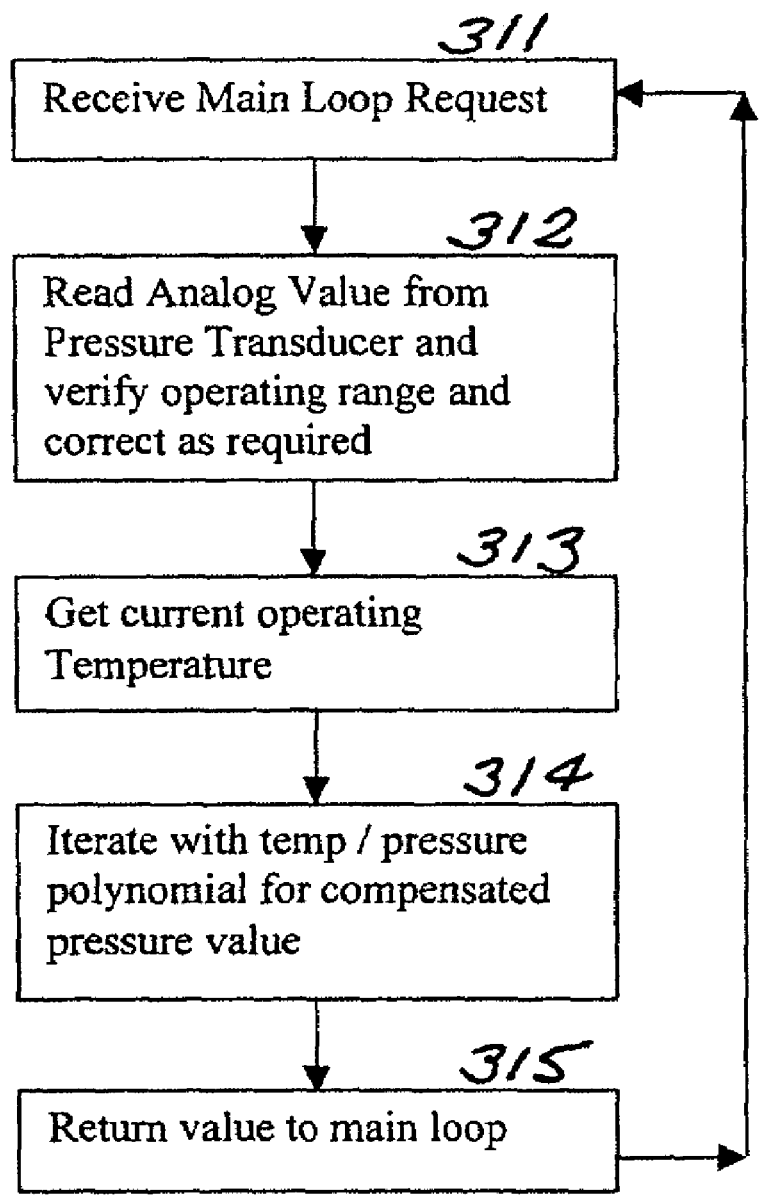
FIG. 5A is a block diagram for the pressure routine of the main operating loop.

The field operation of the EFM may be best understood by reference to FIG. 5, which schematically depicts the main operating loop of the microprocessor 11A of the EFM 10 in accordance with a preferred embodiment. As indicated, the main operating loop comprises a number of routines, which the microprocessor 11A runs sequentially at selected sampling intervals (in accordance with the configuration of the EFM). Upon initiation of pressure routine 310 (FIG. 5A) with a request (step 311) from the main loop, the EFM 10 obtains a current analog gas pressure reading from the pressure transducer (step 312). This pressure reading is first checked to confirm that it is within the pre-determined operating range of the pressure transducer. Then the pressure reading is corrected as may be necessary by comparing it against a pressure calibration table stored in the ROM 11B of the EFM 10. The pressure calibration table corresponds to the specific pressure transducer being used with the EFM 10, and facilitates correction for any inherent tendencies for "drift" of pressure readings across the pressure transducers operating range. Next, a current gas temperature reading is obtained from the temperature transducer (step 313). The EFM 10 then uses these pressure and temperature readings in known polynomial equations to determine a temperature-compensated pressure value (step 314). The temperature-compensated pressure value is then returned to the main loop (step 315).

Figure 5B:
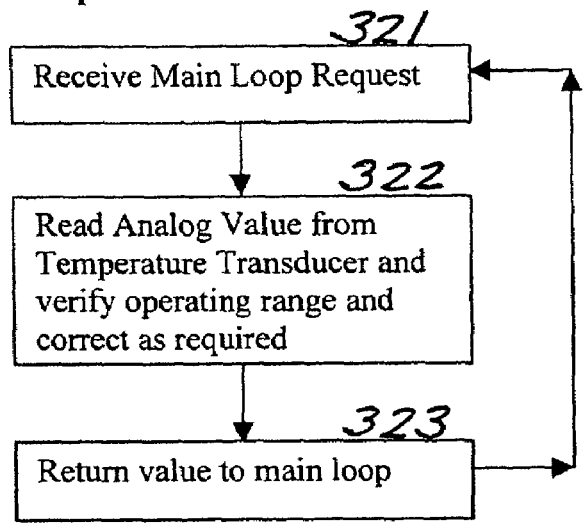
FIG. 5B is a block diagram for the temperature routine of the main operating loop.

The microprocessor then initiates temperature routine 320 (FIG. 5B) upon receipt of a request (step 321) from the main loop. At step 322, a current analog temperature reading is obtained from the temperature transducer, and this reading is checked to confirm that it is within the pre-determined operating range of the temperature transducer. Then the temperature reading is corrected as may be necessary by comparing it against a temperature calibration table stored in the ROM 11B of the EFM 10. The temperature calibration table corresponds to the specific temperature transducer being used with the EFM 10, and facilitates correction for any inherent tendencies for "drift" of temperature readings across the temperature transducer's operating range. The corrected temperature reading is then returned to the main loop (step 323).

Figure 5C:
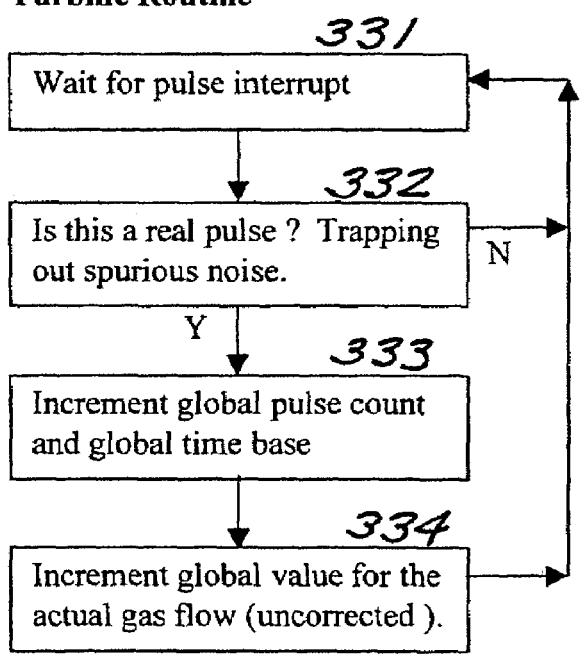
FIG. 5C is a block diagram for the turbine routine of the main operating loop.

In turbine routine 330 (FIG. 5C), the EFM 10 receives pulse signals from the pulse-counting sensor element 40 of the turbine meter 30 (step 331), whereupon the EFM 10 executes a test routine (step 332) to confirm that these are real pulse signals rather than signals resulting from spurious events. Upon confirmation of a valid pulse signal, the EFM 10 increments a stored global pulse count value and a global time base (step 333). A "raw" or uncorrected gas flow rate value is then determined, by comparison of the pulse count value against the K-factor look-up table stored in the ROM 11B of the EFM 10, and the stored global gas flow value is incremented (step 334). This uncorrected value is conventionally measured in "actual" cubic feet (or cubic meters) per unit of time.

Figure 5D:
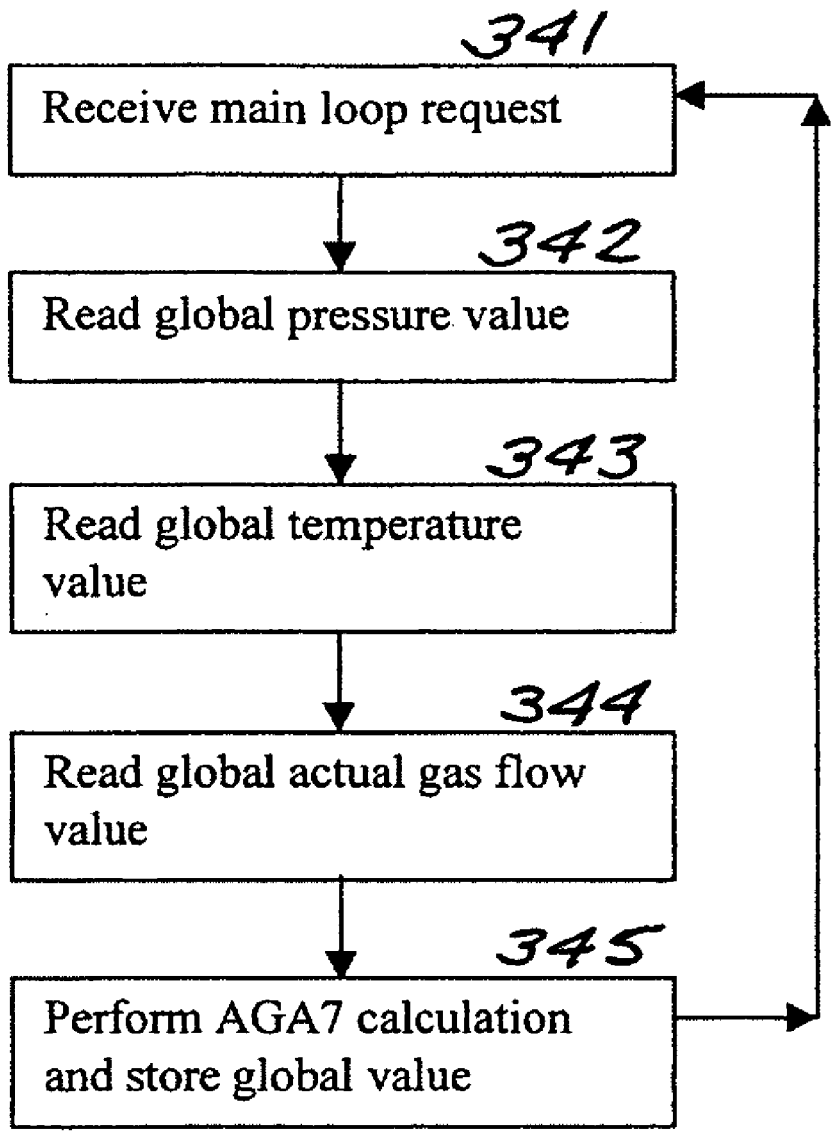
FIG. 5D is a block diagram for the AGA-7 routine of the main operating loop.

In AGA-7 routine 340 (FIG. 5D), the currently stored global gas flow value is corrected for temperature and pressure in accordance with the AGA-7 standard. Upon receipt of a request from the main loop (step 341), the EFM 10 reads the current global pressure value (step 342), temperature value (step 343), and uncorrected gas flow value (step 344). These values are compared to look-up tables stored in the ROM 11B of the EFM 10 to determine a new global gas flow value corrected for pressure and temperature in accordance with AGA-7, and this corrected value is stored in the ROM 11B (step 345).

Figure 5E:
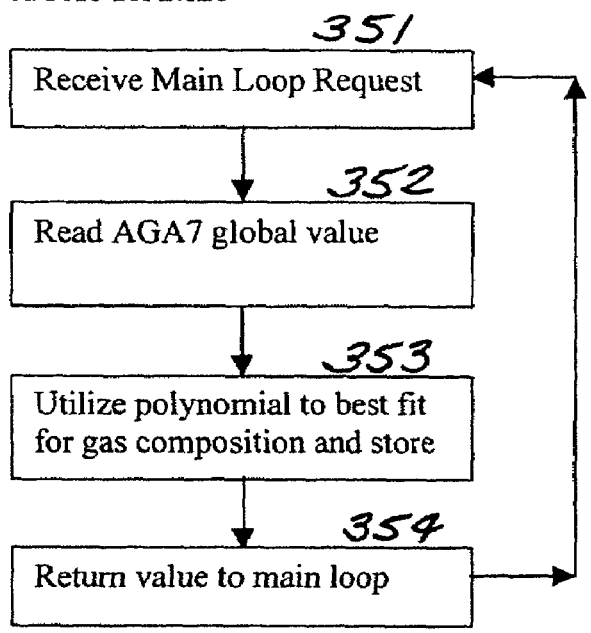
FIG. 5E is a block diagram for the AGA-8 routine of the main operating loop.

In AGA-8 routine 350 (FIG. 5E), the current pressure-and-temperature-corrected gas flow value is corrected for gas composition (i.e., gas density) Upon receiDt of a request from the main loop (step 351). the EFM 10 reads the current AGA-7 global gas flow value (step 352) and compares it against the AGA-8 look-up table in the ROM 11B to determine a new and fully corrected gas flow value, conventionally measured in "standard" cubic feet (or cubic meters) per unit of time (step 353). This value is stored and returned to the main loop (steps 354, 360).

Figure 5F:
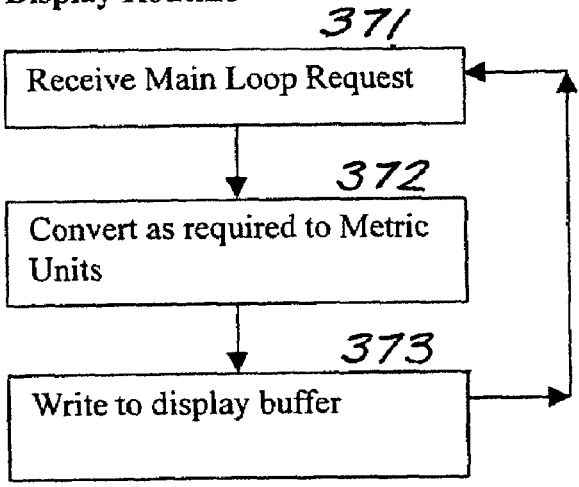
FIG. 5F is a block diagram for the display routine of the main operating loop.

Display routine 370 (FIG. 5F) simply allows for selection of imperial or metric units for display or downloading of gas flow measurement data (i.e., cubic feet or cubic meters per unit of time). Upon receipt of a request from the main loop (step 371). the EFM 10 converts gas flow data from metric to imperial units, or vice versa (step 372), and writes the converted data to a display buffer (step 373).

Figure 5G:
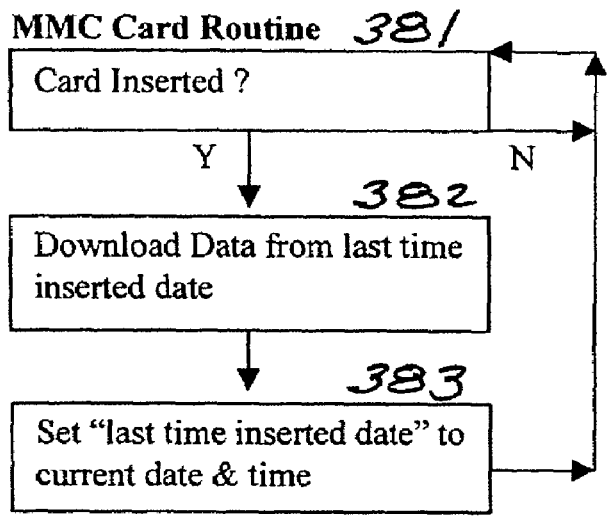
FIG. 5G is a block diagram for the MMC read/write routine of the main operating loop.

MMC card routine 380 (FIG. 5G) is used to download gas flow data onto an MMC card. The EFM 10 first senses whether an MMC card has been inserted in the card reader of the EFM 10 (step 381). If so, the EFM 10 automatically downloads all fully-corrected gas flow measurement data (as determined in AGA-8 routine 350) since the last time a card was inserted (step 382). The date and time of the present card insertion is then stored (step 383). The MMC card may also store the serial number of the EFM 10 and its unique, pre-programmed, well-specific identifier.

Figure 5H:
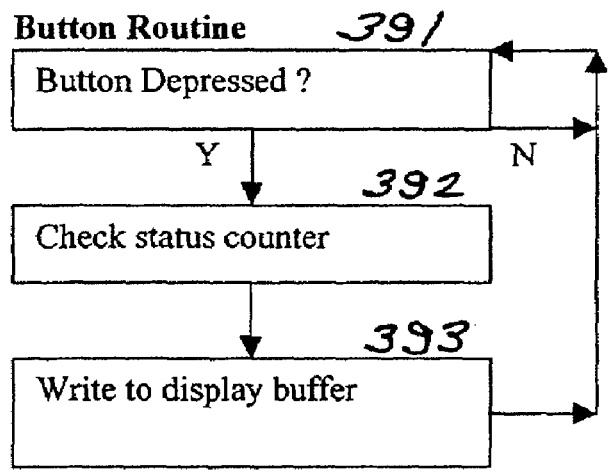
FIG. 5H is a block diagram for the button routine of the main operating loop.

Button routine 390 (FIG. 5H) is initiated when it is desired to read data stored in the ROM 11B of the EFM 10 directly from the digital display screen 24 of the EFM 10. The EFM 10 can be programmed to display a variety of stored data values, and the user can toggle through these values by repeatedly depressing either the internal display button 26 or the external display button 28 of the EFM 10. Upon sensing that either the internal display button 26 or the external display button 28 has been depressed (step 391), the EFM 10 checks a status counter to determine what data value corresponds to the display button's current "toggles" position (step 392), and writes the corresponding value to the display screen 24 (step 393).

It will be readily appreciated by those skilled in the art that various modifications of the present invention may be devised without departing from the essential concept of the invention, and all such modifications are intended to be included in the scope of the claims appended hereto. By way of specific example (but without limiting the scope of the preceding statement), the construction and operation of the EFM of the present invention have been described in the context of embodiments for use with turbine flow meters, and with gas flow measurements being corrected in accordance with AGA-7 and AGA-8. To the extent not explicitly described herein, the construction and operation of embodiments of the invention for use with turbine flow meters in conjunction with AGA-7 and NX-19, as well as embodiments for use with orifice meters in conjunction with AGA-3 and AGA-8, or, alternatively, AGA-3 and NX-19, or in conjunction with other calculation methods for use in calculating gas flows, may be readily deduced by persons skilled in the art of the invention, by analogous extension of the principles and procedures described in this specification.

In this patent document, tile word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

What is claimed is:

1. An electronic gas flow measurement device for use with a turbine meter mounted in a gas pipeline, said device comprising:
    (a) a housing;
    (b) a computer having a microprocessor and a read-only memory (ROM);
    (c) data input means, for entering data in the ROM;
    (d) data output means, for retrieving data stored in the ROM;
    (e) turbine pulse counting means, for counting pulses of the turbine in the turbine meter;
    (f) means for receiving gas temperature inputs; and
    (g) means for receiving gas pressure inputs from upstream of the turbine meter;
wherein:
    (h) the data input means may be used to store, in the ROM:
        h.1 look-up tables of intermediate values for selected gas flow calculation parameters determined in accordance with one or more selected calculation methods for selected ranges of gas temperature, density, and pressure; and
        h.2 look-up tables of "K" values for the turbine, corresponding to a selected range of gas flow rates; and
    (i) the device is programmed with software for:
        i.1 selecting intermediate values from the look-up tables corresponding to gas temperature and pressure inputs;
        i.2 selecting turbine "K" factors from the look-up tables corresponding to turbine pulse count inputs; and
        i.3 processing the selected intermediate values and "K" factors to calculate gas flow rates adjusted for temperature, pressure, and density, in accordance with one or more selected gas flow rate calculation methods.

2. The device of claim 1, wherein the housing is an explosion-proof housing.

3. The device of claim 1, wherein the data input means comprises a keypad interface.

4. The device of claim 1, wherein the data input means comprises a portable data storage medium.

5. The device of claim 4, further comprising an MMC card reader, and wherein the portable data storage medium is an MMC card.

6. The device of claim 1, wherein the data output means comprises a digital read-out.

7. The device of claim 1, wherein the data output means comprises an MMC card.

8. The device of claim 1, wherein the data output means comprises a graphical user interface.

9. The device of claim 1, wherein the data output means comprises a hard-wired data communication link.

10. The device of claim 1, wherein the data output means comprises a wireless data communication link.

11. The device of claim 1, wherein the means for counting turbine pulses comprises a magnetic sensor.

12. The device of claim 1, wherein the means for counting turbine pulses comprises an optical sensor.

13. The device of claim 1, wherein the means for receiving gas temperature inputs comprises a resistive temperature device.

14. The device of claim 1, wherein the power source is a battery.

15. The device of claim 1, wherein the software is adapted to perform calculations using methods conforming with AGA-7 and AGA-8.

16. The device of claim 1, wherein the software is adapted to perform calculations using methods conforming with AGA-7 and NX-19.

17. A method of calculating gas flow rates in conjunction with a turbine meter mounted in a gas pipeline, said method including the steps of:
(a) calculating look-up tables comprising intermediate values for selected gas flow calculation parameters, in accordance with one or more selected calculation methods, for selected ranges of selected input variables;
(b) collecting data readings for the selected input variables for a gas flowing in the pipeline;
(c) using the appropriate look-up tables, determining a set of intermediate values for the selected gas flow calculation parameters, corresponding to the collected data readings;
(d) determining the "K" factor for the turbine over a selected range of turbine pulse frequencies, and preparing a corresponding look-up table;
(e) collecting a turbine pulse frequency reading, and determining a corresponding "K" factor from the corresponding look-up table; and
(f) using the set of intermediate values and "K" factor determined from the look-up tables as input variables, calculating a gas flow rate using one or more selected calculation methods.

18. The method of claim 17, wherein the one or more selected input variables include one or more variables selected from the group consisting of differential gas pressures, gas temperature, and gas density.

19. The method of claim 17, wherein the calculation methods used in the step of calculating a gas flow rate include methods conforming with AGA-7 and AGA-8.

20. The method of claim 17, wherein the calculation methods used in the step of calculating a gas flow rate include methods conforming with AGA-7 and NX-19.

21. The method of claim 17, wherein:
(a) the look-up tables and the collected data readings for the selected input variables are stored in a read-only memory; and
(b) the steps of determining a set of intermediate values, determining a "K" factor corresponding to the collected turbine pulse frequency reading, and calculating a gas flow rate, are performed using a programmed computer.

22. The method of claim 17, further comprising the step of storing the calculated gas flow rate in a read-only memory in a computer.

* * * * *